United States Patent Office 3,223,536
Patented Dec. 14, 1965

3,223,536
SURFACE-COATING COMPOSITIONS CONTAINING HALOBENZYL THIOCYANATES
Theodore A. Girard, Wayne, N.J., assignor, by mesne assignments, to Tenneco Chemicals, Inc., a corporation of Delaware
No Drawing. Filed June 5, 1963, Ser. No. 285,602
20 Claims. (Cl. 106—18)

This invention relates to surface-coating compositions and to their preparation. More particularly it relates to surface-coating compositions that have improved resistance to deterioration resulting from attack by fungi and other microorganisms.

It is well known in the art that paints and varnishes often have inadequate resistance to the action of fungi. Some of these coating compositions, such as enamels and house paints, contain as their resinous binders drying oils, oleoresinous varnishes, or alkyd resins, which are subject to attack by fungi. Others, for example, aqueous dispersions of water-insoluble synthetic linear polymers, generally contain as plasticizers and as thickeners materials that have their origin in animal or vegetable sources and that render the compositions susceptible to mildew. The resulting deterioration of the surface-coating compositions seriously hinders their full scale utilization, particularly in those areas and in those applications that are conducive to such attack.

Various fungicidal materials have been suggested for use in surface-coating compositions, but none has proven entirely satisfactory in this application. Some do not provide the required prolonged protection against fungal attack, while others tend to separate from the applied coating by migration, volatilization, or leaching once the finished coating has been spread in a thin layer over the surface to be protected.

This invention relates to a new class of fungicides for surface-coating compositions. These fungicides, which are thoroughly compatible with the resinous binders that are commonly used in surface-coating compositions, provide excellent and prolonged resistance to deterioration resulting from attack by fungi and other microorganisms without adversely affecting the viscosity and other physical properties of the surface-coating compositions.

The fungicides that are used in the practice of the present invention are halogenated benzyl thiocyanates that have the structural formula

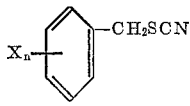

wherein X represents a chlorine, bromine, or iodine atom and $n$ represents a number in the range of 1 to 3, inclusive. Illustrative of these compounds are o-chlorobenzyl thiocyanate, o-bromobenzyl thiocyanate, p-chlorobenzyl thiocyanate, 2,4-dichlorobenzyl thiocyanate, 2,4-dibromobenzyl thiocyanate, 2,4-diiodobenzyl thiocyanate, 3,4-dichlorobenzyl thiocyanate, 3,4-dibromobenzyl thiocyanate, 2,5-dichlorobenzyl thiocyanate, 2-6,dichlorobenzyl thiocyanate, 2,4,5-trichlorobenzyl thiocyanate, 2,3,6-trichlorobenzyl thiocyanate, 2,3,6-tribromobenzyl thiocyanate, and 3-bromo-2,6-dichlorobenzyl thiocyanate. For most applications, the preferred fungicides are the dichlorobenzyl thiocyanates. A single halogenated benzyl thiocyanate or a mixture of two or more of these compounds can be present in the compositions of this invention. Particularly advantageous results have been obtained using mixtures of dichlorobenzyl thiocyanates that contain 30% to 45% of 2,5-dichlorobenzyl thiocyanate, 10% to 20% of 2,3-dichloro- and 3,4-dichlorobenzyl thiocyanate, and 40% to 60% of 2,4-dichloro- and 2,6-dichlorobenzyl thiocyanate.

The halobenzyl thiocyanates may be prepared by any convenient procedure. For example, they may be prepared by reacting the appropriate halobenzyl halide in the presence or in the absence of a solvent with an alkali metal thiocyanate, such as sodium thiocyanate or potassium thiocyanate. The reaction is preferably carried out by heating the reactants at a temperature between about 65° C. and 120° C. in a solvent, such as a lower aliphatic alcohol, ether, or ketone. The products obtained can be used as such, or they can be purified by washing with hot water and/or recrystallization from a suitable solvent.

The halobenzyl thiocyanates can be used to impart fungal resistance to a wide variety of surface-coating compositions including both organic solvent-based and water-based coating systems. They are particularly valuable as fungicides in coatings that contain as their resinous binder either an oleoresinous material or a water-insoluble synthetic linear addition polymer.

In a preferred embodiment of the invention, the halobenzyl thiocyanate is used as the fungicide in an organic solvent-based system that contains an oleoresinous binder. Suitable oleoresinous binders include drying oils, such as linseed oil, tung oil, soybean oil, dehydrated castor oil, safflower oil, or fish oil; bodied drying oils; blends of drying oils or bodied drying oils with a resin component, such as limed rosin, an ester gum, or a phenolic resin; oleoresinous varnishes formed by heating one of the afore-mentioned resins with one or more drying oils or bodied drying oils; and alkyd resins, which are resinous products resulting from the reaction of a polyhydric alcohol, such as pentaerythritol or glycerol, with a dicarboxylic acid, such as phthalic anhydride, and fatty acids.

In another preferred embodiment of the invention, a halobenzyl thiocyanate is used as the fungicide in an aqueous dispersion that contains approximately 10% to 60% by weight of a water-insoluble resinous binder that is an oleoresinous binder as hereinbofer defined or a synthetic linear addition polymer. If desired, a mixture of an oleoresinous binder and a synthetic linear addition polymer can be used. The aqueous dispersions of synthetic linear addition polymers are ordinarily prepared by the emulsion polymerization of ethylenically unsaturated compounds, especially those of monoethylenically unsaturated character, although butadiene, chlorobutadiene, and isoprene may be used to some extent. Illustrative of the synthetic linear addition polymers that can be used as the resinous binder in the aqueous dispersions are polyvinyl acetate; polyvinyl butyrate; polyvinyl chloride; copolymers of vinyl acetate with vinyl chloride; copolymers of vinyl acetate with acrylonitrile; copolymers of vinyl chloride with acrylonitrile; copolymers of vinyl chloride with vinylidene chloride; polyethylene; polyisobutylene; polystyrene; copolymers of styrene with butadiene; copolymers of acrylonitrile with butadiene; copolymers of methacrylic acids esters of alcohols having 1 to 8 carbon atoms with vinyl acetate, vinyl chloride, acrylonitrile, or styrene; copolymers of acrylic acid esters of alcohols having 1 to 8 carbon atoms with vinyl acetate, vinyl chloride, acrylonitrile, or styrene; copolymers of the aforementioned acrylic acid esters, the aforementioned methacrylic acid esters, and acrylic acid; and copolymers of styrene with maleic anhydride.

Only a small concentration of halobenzyl thiocyanate is required in the surface-coating compositions of the present invention. It has been found that as little as 0.10% of halobenzyl thiocyanate, based on the weight of the composition, will bring about an appreciable improvement in the resistance of the composition to attack by fungi. Approximately 2.0% or more of the fungicide, based on the weight of the composition, can be used, but these larger amounts generally do not provide further improvement in the properties of the surface-coating compositions and for this reason are not ordinarily used. While the amount of the fungicide that will provide optimum protection for the surface-coating compositions depends upon such factors as the choice of halobenzyl thiocyanate, the choice of resinous binder and other components of the compositions and the amount of each that is employed, and the application for which the coating composition is intended, in most cases approximately 0.25% to 1.0% of halobenzyl thiocyanate, based on the weight of the surface-coating composition, is used.

Accordingly, this invention provides surface-coating compositions having improved resistance to attack by fungi and other microorganisms that comprise (1) a water-insoluble resinous binder selected from the group consisting of oleoresinous binders, synthetic linear addition polymers obtained by the vinyl polymerization of monoethylenically unsaturated molecules, and mixtures thereof, and (2) approximately 0.10% to 2.0% and preferably 0.25% to 1.0%, based on the weight of said composition, of a fungicide that contains at least one compound having the structural formula

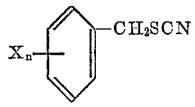

wherein X represents a halogen atom and $n$ represents a number in the range of 1 to 3.

In addition to the resinous binder and the fungicide, the surface-coating compositions of the present invention may contain various auxiliary materials, such as pigments, extenders, solvents, dyes, defoaming agents, driers, emulsifying agents, dispersing agents, plasticizers, other fungicides, bactericides, and corrosion inhibitors, in the amounts ordinarily used for these purposes.

The halobenzyl thiocyanate that is used as the fungicide may be incorporated into the surface-coating composition by any convenient procedure. For example, it can be combined with the pigments and various other components to form a pigment phase that is then mixed with the resinous binder and water or an organic solvent to form the surface-coating composition. Alternatively, it can be added to a composition that contains the resinous binder, pigment, and water or organic solvent. The halobenzyl thiocyanate can be added as such to the other components of the surface-coating composition, or it can be added as a solution of the thiocyanate in a solvent, such as an alcohol, ether, or ketone.

The invention is further illustrated by the examples that follow. It is to be understood that the invention is not limited to the particular conditions or reactions except as set forth in the accompanying claims.

Example 1

A polyvinyl acetate emulsion paint was prepared by mixing together the following materials:

| | Parts by weight |
|---|---|
| Water | 280 |
| Potassium pyrophosphate | 3 |
| Calcium metasilicate | 135 |
| Titanium dioxide (rutile) | 220 |
| 2% aqueous solution of methylcellulose | 200 |
| Diethyl ether of diethylene glycol | 37 |
| Aqueous solution containing 55% by weight of polyvinyl acetate | 350 |

To samples of this paint were added the amounts of chlorobenzyl thiocyanates indicated in Table I. For comparative purposes samples were prepared that contained phenylmercuric acetate as the fungicide. The results of these tests are given in Table I.

The following standard testing procedure was used in all of the examples: Pieces of drawdown paper were dipped into each of the treated paints, dried for 24 hours, and again dipped into the paint. After a 24-hour drying period, one of the samples coated with each of the treated paints was leached for 24 hours in accordance with Method 5831, CCC–T–191b. The coated paper samples were cut into 1¼″ squares. Each of the coated paper squares thus prepared was placed on a plate of malt and mycophil agar, which had previously been inoculated with 1 ml. of a suspension of the test organism. The plates, prepared in triplicate, were incubated at 28° C. and observed weekly The growth was estimated according to the following key, and the results of the replicate plates were averaged:

slzo: Slight zone of inhibition
zo: Zone of inhibition
0: No growth, no zone
2: Very slight growth
4: Slight growth
6: Moderate growth
8: Moderate to heavy growth
10: Heavy growth

TABLE I

| Fungicide | Mixture containing 55% o-chlorobenzyl thiocyanate and 45% p-chlorobenzyl thiocyanate | | | Mixture containing 50% 2,5-dichlorobenzyl thiocyanate, 37% 2,4-dichlorobenzyl thiocyanate, and 13% 3,4-dichlorobenzyl thiocyanate | | | 2,4-dichlorobenzyl thiocyanate | | | 3,4-dichlorobenzyl thiocyanate | | | 2,3,6-trichlorobenzyl thiocyanate | | | Phenylmercuric acetate |
|---|---|---|---|---|---|---|---|---|---|---|---|---|---|---|---|---|
| Percent fungicide | 0.25 | 0.5 | 1.0 | 0.25 | 0.5 | 1.0 | 0.25 | 0.5 | 1.0 | 0.25 | 0.5 | 1.0 | 0.25 | 0.5 | 1.0 | 0.5 |
| Effect on color of paint | none | none | none | none | none | none | none | none | none | none | none | none | none | none | none | none |
| Effect on viscosity of paint | none | none | none | none | none | none | none | none | none | none | none | none | none | none | none | none |
| Fungicidal activity: | | | | | | | | | | | | | | | | |
| *Aspergillus niger*— | | | | | | | | | | | | | | | | |
| Unleached: | | | | | | | | | | | | | | | | |
| 1 week | 0 | 0 | zo | 0 | 0 | 0 | 0 | 0 | 0 | 0 | slzo | zo | 0 | 0 | 0 | zo |
| 2 weeks | 0 | 0 | zo | 0 | 0 | 0 | 0 | 0 | 0 | 0 | 0 | slzo | 2 | 0 | 0 | zo |
| 4 weeks | 2 | 0 | slzo | 2 | 0 | 0 | 2 | 2 | 0 | 0 | 0 | slzo | 2 | 0 | 0 | zo |
| Leached: | | | | | | | | | | | | | | | | |
| 1 week | 4 | 0 | 0 | 4 | 0 | 0 | 0 | 0 | 0 | 0 | 0 | slzo | 6 | 4 | 2 | zo |
| 2 weeks | 6 | 0 | 0 | 8 | 0 | 0 | 2 | 0 | 0 | 0 | 0 | 0 | 8 | 6 | 4 | zo |
| 4 weeks | 8 | 4 | 0 | 8 | 4 | 0 | 4 | 2 | 0 | 2 | 0 | 0 | 10 | 8 | 4 | zo |
| *Penicillium cyclopium*— | | | | | | | | | | | | | | | | |
| Unleached: | | | | | | | | | | | | | | | | |
| 1 week | 0 | 0 | slzo | 0 | 0 | 0 | 0 | 0 | 0 | 0 | 0 | zo | 0 | 0 | 0 | 0 |
| 2 weeks | 2 | 0 | 0 | 2 | 0 | 0 | 2 | 0 | 0 | 0 | 0 | zo | 0 | 0 | 0 | 0 |
| 4 weeks | 4 | 2 | 0 | 2 | 2 | 0 | 4 | 2 | 0 | 0 | 0 | zo | 2 | 0 | 0 | 2 |
| Leached: | | | | | | | | | | | | | | | | |
| 1 week | 6 | 4 | 0 | 4 | 2 | 0 | 0 | 0 | 0 | 0 | 0 | slzo | 8 | 6 | 0 | 2 |
| 2 weeks | 10 | 8 | 0 | 8 | 6 | 0 | 6 | 2 | 0 | 2 | 0 | slzo | 10 | 6 | 4 | 4 |
| 4 weeks | 10 | 10 | 2 | 10 | 8 | 2 | 10 | 8 | 0 | 6 | 0 | slzo | 10 | 10 | 8 | 8 |

TABLE I—Continued

| Fungicide | Mixture containing 55% o-chlorobenzyl thiocyanate and 45% p-chlorobenzyl thiocyanate | | | Mixture containing 50% 2,5-dichlorobenzyl thiocyanate, 37% 2,4-dichlorobenzyl thiocyanate, and 13% 3,4-dichlorobenzyl thiocyanate | | | 2,4-dichlorobenzyl thiocyanate | | | 3,4-dichlorobenzyl thiocyanate | | | 2,3,6-trichlorobenzyl thiocyanate | | | Phenylmercuric acetate |
|---|---|---|---|---|---|---|---|---|---|---|---|---|---|---|---|---|
| Fungicidal activity—cont. | | | | | | | | | | | | | | | | |
| aspergillus oryzae | | | | | | | | | | | | | | | | |
| Unleached: | | | | | | | | | | | | | | | | |
| 1 week | 6 | 0 | zo | 6 | 0 | zo | 2 | 0 | slzo | 0 | 0 | zo | 8 | 6 | 6 | 0 |
| 2 weeks | 6 | 0 | 0 | 6 | 0 | slzo | 4 | 0 | slzo | 0 | 0 | slzo | 8 | 6 | 6 | 0 |
| 4 weeks | 8 | 0 | 0 | 8 | 0 | 0 | 6 | 2 | 0 | 2 | 0 | 0 | 8 | 8 | 8 | 0 |
| Leached: | | | | | | | | | | | | | | | | |
| 1 week | 10 | 8 | 2 | 8 | 4 | 0 | 8 | 0 | 0 | 2 | 0 | 0 | 10 | 8 | 4 | 8 |
| 2 weeks | 10 | 8 | 2 | 8 | 6 | 0 | 10 | 4 | 0 | 4 | 0 | 0 | 10 | 10 | 6 | 10 |
| 4 weeks | 10 | 8 | 4 | 10 | 8 | 0 | 10 | 6 | 0 | 6 | 2 | 0 | 10 | 10 | 8 | 10 |
| Pullularia pullulans— | | | | | | | | | | | | | | | | |
| Unleached: | | | | | | | | | | | | | | | | |
| 1 week | 0 | slzo | zo | slzo | slzo | slzo | 0 | slzo | zo | 0 | slzo | zo | 0 | slzo | zo | zo |
| 2 weeks | 0 | slzo | zo | 0 | slzo | slzo | 0 | slzo | zo | 0 | slzo | zo | 0 | slzo | slzo | zo |
| 4 weeks | 0 | slzo | zo | 0 | slzo | slzo | 0 | slzo | zo | 0 | slzo | zo | 0 | slzo | slzo | zo |
| Leached: | | | | | | | | | | | | | | | | |
| 1 week | 0 | zo | zo | 0 | slzo | zo | 0 | 0 | 0 | 0 | slzo | zo | 0 | 0 | 0 | zo |
| 2 weeks | 0 | slzo | zo | 0 | 0 | slzo | 0 | 0 | 0 | 0 | slzo | zo | 0 | 0 | 0 | zo |
| 4 weeks | 0 | slzo | zo | 0 | slzo | slzo | 0 | 0 | 0 | 0 | slzo | zo | 0 | 0 | 0 | slzo |

*Example 2*

Mixtures of dichlorobenzyl thiocyanate isomers were evaluated as fungicides for polyvinyl acetate emulsion paint by the procedure described in Example 1. The mixtures used had the following isomer distribution:

| Mixture | 2,4-dichloro- and 2,6-dichlorobenzyl thiocyanates | 2,5-dichlorobenzyl thiocyanate | 2,3-dichloro- and 3,4-dichlorobenzyl thiocyanates |
|---|---|---|---|
| A | 44.5 | 37.4 | 18.1 |
| B | 49.0 | 32.8 | 18.2 |
| C | 54.5 | 33.5 | 12.0 |
| D | 45.0 | 40.6 | 14.4 |

The results of these tests are given in Table II.

*Example 3*

An alkyd resin-based blister-resistant house paint was prepared by mixing together the following materials:

| | Parts by weight |
|---|---|
| Titanium dioxide (anatase) | 100 |
| Titanium dioxide (rutile) | 100 |
| Talc | 356 |
| Alkyd resin (long oil) | 389 |
| Mineral spirits | 163 |
| Zinc naphthenate (8%) | 4.9 |
| Calcium naphthenate (4%) | 12.1 |
| Cobalt naphthenate (6%) | 1.6 |

TABLE II

| Fungicide | Mixture A | | | Mixture B | | | Mixture C | | | Mixture D | | | 3,4-dichlorobenzyl thiocyanate | | | Phenylmercuric acetate | None |
|---|---|---|---|---|---|---|---|---|---|---|---|---|---|---|---|---|---|
| Percent fungicide | 0.25 | 0.5 | 1.0 | 0.25 | 0.5 | 1.0 | 0.25 | 0.5 | 1.0 | 0.25 | 0.5 | 1.0 | 0.25 | 0.5 | 1.0 | 0.5 | |
| Fungicidal activity: | | | | | | | | | | | | | | | | | |
| A. niger— | | | | | | | | | | | | | | | | | |
| Unleached: | | | | | | | | | | | | | | | | | |
| 1 week | 0 | 0 | 0 | 0 | 0 | 0 | 0 | 0 | 0 | 0 | 0 | 0 | 0 | slzo | zo | slzo | 0 |
| 2 weeks | 0 | 0 | 0 | 0 | 0 | 0 | 0 | 0 | 0 | 0 | 0 | 0 | 0 | slzo | zo | 0 | 2 |
| 3 weeks | 0 | 0 | 0 | 0 | 0 | 0 | 0 | 0 | 0 | 0 | 0 | 0 | 0 | slzo | zo | 2 | 4 |
| 4 weeks | 0 | 0 | 0 | 0 | 0 | 0 | 2 | 0 | 0 | 2 | 0 | 0 | 0 | 0 | zo | 2 | 4 |
| Leached: | | | | | | | | | | | | | | | | | |
| 1 week | 0 | 0 | 0 | 0 | 0 | 0 | 0 | 0 | 0 | 0 | 0 | 0 | 0 | 0 | zo | 2 | 2 |
| 2 weeks | 0 | 0 | 0 | 0 | 0 | 0 | 2 | 0 | 0 | 0 | 0 | 0 | 0 | 0 | zo | 2 | 4 |
| 3 weeks | 4 | 0 | 0 | 2 | 0 | 0 | 4 | 0 | 0 | 2 | 0 | 0 | 0 | 0 | zo | 4 | 4 |
| 4 weeks | 6 | 0 | 0 | 4 | 2 | 0 | 6 | 0 | 0 | 4 | 0 | 0 | 0 | 0 | 0 | 6 | 6 |
| P. cyclopium— | | | | | | | | | | | | | | | | | |
| Unleached: | | | | | | | | | | | | | | | | | |
| 1 week | 0 | 0 | slzo | 0 | 0 | 0 | 0 | 0 | 0 | 0 | 0 | 0 | 0 | 0 | 0 | slzo | 0 |
| 2 weeks | 0 | 0 | 0 | 0 | 0 | 0 | 0 | 0 | 0 | 0 | 0 | 0 | 0 | 0 | 0 | 0 | 2 |
| 3 weeks | 0 | 0 | 0 | 0 | 0 | 0 | 0 | 0 | 0 | 0 | 0 | 0 | 0 | 0 | zo | 2 | 4 |
| 4 weeks | 0 | 0 | 0 | 0 | 0 | 0 | 0 | 0 | 0 | 0 | 0 | 0 | 0 | 0 | zo | 2 | 4 |
| Leached: | | | | | | | | | | | | | | | | | |
| 1 week | 0 | 0 | 0 | 0 | 0 | 0 | 0 | 0 | 0 | 0 | 0 | 0 | 0 | 0 | zo | 2 | 6 |
| 2 weeks | 0 | 0 | 0 | 0 | 0 | 0 | 2 | 0 | 0 | 0 | 0 | 0 | 2 | 0 | zo | 2 | 8 |
| 3 weeks | 2 | 2 | 0 | 4 | 0 | 0 | 4 | 0 | 0 | 4 | 0 | 0 | 4 | 0 | zo | 4 | 10 |
| 4 weeks | 4 | 4 | 0 | 6 | 2 | 0 | 6 | 0 | 0 | 6 | 2 | 0 | 6 | 0 | zo | 6 | 10 |
| Fungicidal activity—Con. | | | | | | | | | | | | | | | | | |
| A. oryzae— | | | | | | | | | | | | | | | | | |
| Unleached: | | | | | | | | | | | | | | | | | |
| 1 week | 0 | 0 | zo | 0 | 0 | zo | 0 | slzo | zo | 0 | 0 | zo | 0 | 0 | zo | zo | 4 |
| 2 weeks | 2 | 0 | zo | 2 | 0 | slzo | 0 | 0 | zo | 2 | 0 | zo | 0 | 0 | zo | 0 | 6 |
| 3 weeks | 2 | 0 | zo | 4 | 0 | slzo | 2 | 0 | zo | 4 | 0 | slzo | 0 | 0 | zo | 0 | 6 |
| 4 weeks | 4 | 0 | slzo | 4 | 0 | 0 | 2 | 0 | slzo | 6 | 0 | 0 | 0 | 0 | zo | 0 | 8 |
| Leached: | | | | | | | | | | | | | | | | | |
| 1 week | 0 | 0 | zo | 2 | 0 | slzo | 2 | 0 | slzo | 2 | 0 | slzo | 0 | 0 | zo | 2 | 6 |
| 2 weeks | 4 | 0 | slzo | 4 | 0 | 0 | 4 | 0 | slzo | 4 | 2 | slzo | 0 | 0 | zo | 8 | 10 |
| 3 weeks | 6 | 0 | 0 | 6 | 0 | 0 | 6 | 0 | 0 | 6 | 4 | 0 | 2 | 0 | zo | 10 | 10 |
| 4 weeks | 6 | 0 | 0 | 6 | 2 | 0 | 6 | 0 | 0 | 6 | 4 | 0 | 2 | 0 | zo | 10 | 10 |
| P. pullulans— | | | | | | | | | | | | | | | | | |
| Unleached: | | | | | | | | | | | | | | | | | |
| 1 week | slzo | zo | zo | slzo | zo | zo | slzo | zo | zo | zo | zo | zo | zo | zo | zo | zo | zo |
| 2 weeks | 0 | zo | zo | 0 | zo | zo | slzo | zo | zo | zo | zo | zo | zo | zo | zo | zo | zo |
| 3 weeks | 0 | zo | zo | 0 | slzo | zo | slzo | zo | zo | zo | zo | zo | zo | slzo | zo | zo | zo |
| 4 weeks | 0 | zo | zo | 0 | slzo | zo | slzo | zo | zo | zo | zo | zo | zo | 0 | zo | zo | zo |
| Leached: | | | | | | | | | | | | | | | | | |
| 1 week | 0 | 0 | slzo | 0 | 0 | 0 | 0 | 0 | slzo | 0 | 0 | zo | 0 | 0 | zo | zo | zo |
| 2 weeks | 0 | 0 | 0 | 0 | 0 | 0 | 0 | 0 | 0 | 0 | 0 | zo | 0 | 0 | zo | slzo | slzo |
| 3 weeks | 0 | 0 | 0 | 0 | 0 | 0 | 0 | 0 | 0 | 0 | 0 | zo | 0 | 0 | slzo | slzo | 0 |
| 4 weeks | 0 | 0 | 0 | 0 | 2 | 0 | 0 | 0 | 0 | 0 | 0 | 0 | 0 | 0 | slzo | 0 | 0 |

To samples of this paint were added the amounts of a mixture of dichlorobenzyl thiocyanate isomers indicated in Table III. The mixture of isomers contained 44.5% of 2,4-dichloro- and 2,6-dichlorobenzyl thiocyanates, 37.4% of 2,5-dichlorobenzyl thiocyanate, and 18.1% of 2,3-dichloro- and 3,4-dichlorobenzyl thiocyanates. The resistance of the treated samples to attack by fungi was determined using *Pullularia pullulans* and a mixed fungal spore suspension that contained *Pullularia pullulans, Alternaria solani,* and Cladosporium sp. The results of these tests are given in Table III.

TABLE III

| Fungicide | Mixture of dichlorobenzyl thiocyanates | | | | None |
|---|---|---|---|---|---|
| Percent fungicide | 0.10 | 0.25 | 0.50 | 1.00 | |
| Effect on viscosity of paint | None | None | None | None | |
| Fungicidal activity: | | | | | |
| *P. pullulans*— | | | | | |
| Unleached: | | | | | |
| 1 week | 0 | 0 | 0 | zo | 0 |
| 2 weeks | 0 | 0 | 0 | zo | 0 |
| 4 weeks | 0 | 0 | 0 | zo | 0 |
| 6 weeks | 0 | 0 | 0 | 0 | 2 |
| Leached: | | | | | |
| 1 week | 0 | 0 | 0 | zo | 0 |
| 2 weeks | 0 | 0 | 0 | zo | 0 |
| 4 weeks | 0 | 0 | 0 | 0 | 2 |
| 6 weeks | 2 | 2 | 0 | 0 | 6 |
| Mixed fungal spore suspension— | | | | | |
| Unleached: | | | | | |
| 1 week | 0 | 0 | 0 | zo | 0 |
| 2 weeks | 0 | 0 | 0 | zo | 0 |
| 4 weeks | 2 | 0 | 0 | 0 | 2 |
| 6 weeks | 2 | 2 | 0 | 0 | 2 |
| Leached: | | | | | |
| 1 week | 0 | 0 | 0 | zo | 0 |
| 2 weeks | 0 | 0 | 0 | 0 | 2 |
| 4 weeks | 2 | 0 | 0 | 0 | 4 |
| 6 weeks | 6 | 4 | 2 | 0 | 6 |

*Example 4*

An exterior house paint was prepared by mixing together the following materials:

| | Parts by weight |
|---|---|
| Basic lead carbonate | 288 |
| Zinc oxide | 232 |
| Titanium dioxide (rutile) | 149 |
| Talc | 260 |
| Linseed oil (alkali refined) | 342 |
| Bodied linseed oil | 114 |
| Mineral spirits | 114 |
| Antiskinning agent (Exkin 2) | 2 |
| Manganese naphthenate (6%) | 2.27 |
| Lead naphthenate (24%) | 11.3 |

To samples of this paint were added the amounts of a mixture of dichlorobenzyl thiocyanate isomers indicated in Table IV. The mixture of isomers contained 44.5% of 2,4-dichloro- and 2,6-dichlorobenzyl thiocyanates, 37.4% of 2,5-dichlorobenzyl thiocyanate, and 18.1% of 2,3-dichloro- and 3,4-dichlorobenzyl thiocyanates. The resistance of the treated samples to attack by fungi was determined using *Pullularia pullulans* and a mixed fungal spore suspension that contained *Pullularia pullulans, Alternaria solani,* and Cladosporium sp. The results of these tests are given in Table IV.

TABLE IV

| Fungicide | Mixture of dichlorobenzyl thiocyanates | | | | None |
|---|---|---|---|---|---|
| Percent fungicide | 0.10 | 0.25 | 0.50 | 1.00 | |
| Effect on viscosity of paint | None | None | None | None | |
| Fungicidal activity: | | | | | |
| *P. pullulans*— | | | | | |
| Unleached: | | | | | |
| 1 week | 0 | 0 | zo | zo | 0 |
| 2 weeks | 0 | 0 | 0 | zo | 0 |
| 4 weeks | 0 | 0 | 0 | 0 | 1 |
| 6 weeks | 0 | 0 | 0 | 0 | 1 |
| Leached: | | | | | |
| 1 week | 0 | 0 | zo | zo | 0 |
| 2 weeks | 0 | 0 | 0 | 0 | 0 |
| 4 weeks | 0 | 0 | 0 | 0 | 1 |
| 6 weeks | 0 | 0 | 0 | 0 | 1 |
| Mixed Fungal Spore Suspension— | | | | | |
| Unleached: | | | | | |
| 1 week | 0 | 0 | 0 | zo | 0 |
| 2 weeks | 0 | 0 | 0 | zo | 0 |
| 4 weeks | 0 | 0 | 0 | 0 | 1 |
| 6 weeks | 1 | 1 | 0 | 0 | 1 |
| Leached: | | | | | |
| 1 week | 0 | 0 | 0 | zo | 0 |
| 2 weeks | 0 | 0 | 0 | 0 | 0 |
| 4 weeks | 0 | 0 | 0 | 0 | 1 |
| 6 weeks | 1 | 1 | 0 | 0 | 1 |

What is claimed is:

1. A surface-coating composition having improved resistance to attack by fungi and other microorganisms which comprises (1) a water-insoluble resinous binder selected from the group consisting of oleoresinous binders, synthetic linear addition polymers obtained by the vinyl polymerization of monoethylenically unsaturated molecules, and mixtures thereof, and (2) approximately 0.10% to 2.0%, based on the weight of said composition, of a fungicide comprising a compound having the structural formula

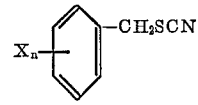

wherein X represents a member selected from the group consisting of chlorine, bromine, and iodine atoms and $n$ represents a number in the range of 1 to 3.

2. The composition of claim 1 wherein the fungicide is o-chlorobenzyl thiocyanate.

3. The composition of claim 1 wherein the fungicide is 2,4-dichlorobenzyl thiocyanate.

4. The composition of claim 1 wherein the fungicide is 3,4-dichlorobenzyl thiocyanate.

5. The composition of claim 1 wherein the fungicide is a mixture of dichlorobenzyl thiocyanates containing 30% to 45% of 2,5-dichlorobenzyl thiocyanate, 10% to 20% of 2,3-dichloro- and 3,4-dichlorobenzyl thiocyanate, and 40% to 60% of 2,4-dichloro- and 2,6-dichlorobenzyl thiocyanate.

6. The composition of claim 1 wherein the fungicide is 2,3,6-trichlorobenzyl thiocyanate.

7. A surface-coating composition having improved resistance to attack by fungi and other microorganisms which comprises (1) a water-insoluble resinous binder selected from the group consisting of oleoresinous binders, synthetic linear addition polymers obtained by the vinyl polymerization of monoethylenically unsaturated molecules, and mixtures thereof, and (2) approximately 0.25% to 1.0%, based on the weight of said composition, of a fungicide comprising a compound having the structural formula

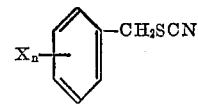

wherein X represents a member selected from the group consisting of chlorine, bromine, and iodine atoms and $n$ represents a number in the range of 1 to 3.

8. A surface-coating composition having improved resistance to attack by fungi and other microorganisms comprising an aqueous dispersion containing 10% to 60% by weight of polyvinyl acetate and approximately 0.25% to 1.0%, based on the weight of said composition, of a fungicide comprising a compound having the structural formula

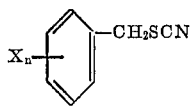

wherein X represents a member selected from the group consisting of chlorine, bromine, and iodine atoms and $n$ represents a number in the range of 1 to 3.

9. A surface-coating composition having improved resistance to attack by fungi and other microorganisms comprising an aqueous dispersion containing 10% to 60% by weight of polyvinyl acetate and approximately 0.25% to 1.0%, based on the weight of said composition, of 2,4-dichlorobenzyl thiocyanate.

10. A surface-coating composition having improved resistance to attack by fungi and other microorganisms that comprises an aqueous dispersion containing 10% to 60% by weight of polyvinyl acetate and approximately 0.25% to 1.0%, based on the weight of said composition, of 3,4-dichlorobenzyl thiocyanate.

11. A surface-coating composition having improved resistance to attack by fungi and other microorganisms that comprises an aqueous dispersion containing 10% to 60% by weight of polyvinyl acetate and approximately 0.25% to 1.0%, based on the weight of said composition, of a mixture of dichlorobenzyl thiocyanates containing 30% to 45% of 2,5-dichlorobenzyl thiocyanate, 10% to 20% of 2,3-dichloro- and 3,4-dichlorobenzyl thiocyanate, and 40% to 60% of 2,4-dichloro- and 2,6-dichlorobenzyl thiocyanate.

12. A surface-coating composition having improved resistance to attack by fungi and other microorganisms which comprises (1) an oleoresinous binder and (2) approximately 0.25% to 1.0%, based on the weight of said composition, of a fungicide comprising a compound having the structural formula

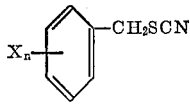

wherein X represents a member selected from the group consisting of chlorine, bromine, and iodine atoms and $n$ represents a number in the range of 1 to 3.

13. The composition of claim 12 wherein the fungicide is a mixture of dichlorobenzyl thiocyanates containing 30% to 45% of 2,5-dichlorobenzyl thiocyanate, 10% to 20% of 2,3-dichloro- and 3,4-dichlorobenzyl thiocyanate, and 40% to 60% of 2,4-dichloro- and 2,6-dichlorobenzyl thiocyanate.

14. The method of controlling the growth of fungi and other microorganisms in a surface-coating composition that contains a water-insoluble resinous binder selected from the group consisting of oleoresinous binders, synthetic linear addition polymers obtained by the vinyl polymerization of monoethylenically unsaturated molecules, and mixtures thereof which comprises incorporating in said composition approximately 0.10% to 2.0%, based on the weight of said composition, of a fungicide comprising a compound having the structural formula

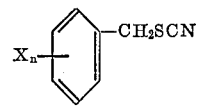

wherein X represents a member selected from the group consisting of chlorine, bromine, and iodine atoms and $n$ represents a number in the range of 1 to 3.

15. The method of controlling the growth of fungi and other microorganisms in a surface-coating composition that contains 10% to 60% by weight of a water-insoluble resinous binder selected from the group consisting of oleoresinous binders, synthetic linear addition polymers obtained by the vinyl polymerization of monoethylenically unsaturated molecules, and mixtures thereof which comprises incorporating in said composition approximately 0.25% to 1.0%, based on the weight of said composition, of a fungicide comprising a compound having the structural formula

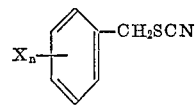

wherein X represents a member selected from the group consisting of chlorine, bromine, and iodine atoms and $n$ represents a number in the range of 1 to 3.

16. The method of claim 15 wherein the fungicide is o-chlorobenzyl thiocyanate.

17. The method of claim 15 wherein the fungicide is 2,4-dichlorobenzyl thiocyanate.

18. The method of claim 15 wherein the fungicide is 3,4-dichlorobenzyl thiocyanate.

19. The method of claim 15 wherein the fungicide is a mixture of dichlorobenzyl thiocyanates containing 30% to 45% of 2,5-dichlorobenzyl thiocyanate, 10% to 20% of 2,3-dichloro- and 3,4-dichlorobenzyl thiocyanate, and 40% to 60% of 2,4-dichloro- and 2,6-dichlorobenzyl thiocyanate.

20. The method of claim 15 wherein the fungicide is 2,3,6-trichlorobenzyl thiocyanate.

References Cited by the Examiner
UNITED STATES PATENTS

| | | | |
|---|---|---|---|
| 2,943,106 | 6/1960 | McKay et al. | 260—454 |
| 2,965,537 | 12/1960 | Rosen | 167—30 |
| 2,977,250 | 3/1961 | Brysson et al. | 117—138.5 |
| 2,986,492 | 5/1961 | Cannon | 167—31 |
| 3,109,015 | 10/1963 | Rosen | 260—454 |

ALEXANDER H. BRODMERKEL, *Primary Examiner.*

MORRIS LIEBMAN, *Examiner.*